(12) United States Patent
Sakurai

(10) Patent No.: US 11,196,458 B2
(45) Date of Patent: Dec. 7, 2021

(54) READING DEVICE AND METHOD

(71) Applicant: TOSHIBA TEC KABUSHIKI KAISHA, Tokyo (JP)

(72) Inventor: Wataru Sakurai, Izu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 6 days.

(21) Appl. No.: 16/655,777

(22) Filed: Oct. 17, 2019

(65) Prior Publication Data

US 2020/0195309 A1 Jun. 18, 2020

(30) Foreign Application Priority Data

Dec. 14, 2018 (JP) .............................. JP2018-234548

(51) Int. Cl.
*G06K 7/10* (2006.01)
*H04B 5/00* (2006.01)

(52) U.S. Cl.
CPC ....... *H04B 5/0062* (2013.01); *G06K 7/10237* (2013.01); *G06K 7/10386* (2013.01)

(58) Field of Classification Search
CPC ...................... G06K 7/10198; G06K 7/10366
See application file for complete search history.

(56) References Cited

U.S. PATENT DOCUMENTS

2005/0263592 A1* 12/2005 Berger ................. G06Q 10/087
235/385
2008/0024275 A1 1/2008 Quan et al.
2010/0328037 A1 12/2010 Thomas et al.
2011/0037575 A1 2/2011 Horst et al.
2015/0332209 A1* 11/2015 DeBusk ................. G06Q 10/10
705/2

(Continued)

FOREIGN PATENT DOCUMENTS

EP 2165287 A1 3/2010
EP 2267634 A1 12/2010
JP 2005157645 A * 6/2005

(Continued)

OTHER PUBLICATIONS

Extended European Search Report dated Mar. 18, 2020, mailed in counterpart European Patent Application No. 19191430.8, 11 pages.

*Primary Examiner* — Thien M Le
*Assistant Examiner* — April A Taylor
(74) *Attorney, Agent, or Firm* — Kim & Stewart LLP

(57) ABSTRACT

A reading device includes an antenna, a data storage unit, and a controller. The antenna is configured to receive tag information from RFID tags attached to objects in a receiving range. The data storage unit stores an object ID in association with a predetermined total number of RFID tags on an object corresponding to the object ID. The controller is configured to start a reading operation in which the antenna emits radio waves and receives tag information from the RFID tags. The controller counts the number of RFID tags associated with the object ID according to the tag information received during the reading operation. The counted number is compared to the predetermined total number associated with the object ID, and the controller controls a timing for terminating the reading operation based on the comparison.

16 Claims, 7 Drawing Sheets

(56) References Cited

U.S. PATENT DOCUMENTS

2016/0125211 A1* 5/2016 Hattori ............... G06K 7/10366
                                                                          340/10.1
2017/0076117 A1* 3/2017 Pavlov ............... G06K 7/10069

FOREIGN PATENT DOCUMENTS

| JP | 2016-038875 A | 3/2016 |
| WO | 2009004366 A1 | 1/2009 |
| WO | 2017152213 A1 | 9/2017 |

* cited by examiner

| | FIRST IDENTIFICATION CODE | SECOND IDENTIFICATION CODE |
|---|---|---|
| T1a | 00001 | 0001 |
| T1b | 00001 | 0002 |
| T1c | 00001 | 0003 |

FIG. 8

| FIRST IDENTIFICATION CODE | READING SITUATION |
|---|---|
| 00001 | 3/3 |
| 00002 | 1/2 |
| 00003 | 3/4 |

21b

READING DEVICE AND METHOD

CROSS-REFERENCE TO RELATED APPLICATION

This application is based upon and claims the benefit of priority from Japanese Patent Application No. 2018-234548, filed on Dec. 14, 2018, the entire contents of which are incorporated herein by reference.

FIELD

Embodiments described therein relate generally to a reading device and a method.

BACKGROUND

In the related art, there are reading devices that read information stored in RFID tags (also referred to as RF tags, electronic tags, IC tags, or the like), and the reading devices are used for various purposes. For example, reading devices that read information from RFID tags attached to objects such as retail commodities are used. In the related art, technologies for automatically stopping tag reading after a predetermined time elapses from a reading start are proposed.

Some reading devices can read a plurality of RFID tags simultaneously and in a contactless manner, but in such devices some of the RFID tags may not be correctly read due to reasons such as a failure of an RFID tag or an inappropriate positional relation between one or more RFID tags and the reading antennas.

In the above-described related art, even though reading of some of the RFID tags is not yet completed, the reading may be stopped when a predetermined time elapses. Therefore, there is a possibility that some RFID tags in a particular group may not be read due to a timing out of the reader. When a user can determine the time at which the reading is to be stopped and many objects are being read, it may not be possible for the user to correctly ascertain that all RFID tags have been read. Therefore, it is a possibility that the user will either stop the reading too soon or wait more than is necessary for the reading attempt to be finished. Thus, a technology for controlling when reading stops in accordance with the actual reading states of the RFID tags is desirable.

DESCRIPTION OF THE DRAWINGS

FIG. 8 is a diagram illustrating an example of reading situation information displayed on a main unit.

DETAILED DESCRIPTION

Embodiments provide a reading device and a method capable of controlling a timing at which reading is stopped in accordance with a reading situation of RFID tags.

In general, according to an embodiment, a reading device includes an antenna, a data storage unit, and a controller. The antenna is configured to receive tag information from RFID tags attached to objects in a receiving range. The data storage unit stores an object ID in association with a predetermined total number of RFID tags expected to be on an object corresponding to the object ID. The controller is configured to start a reading operation in which the antenna emits radio waves and receives tag information from the RFID tags. The controller counts the number of RFID tags associated with the object ID according to the tag information received during the reading operation. The counted number is compared to the predetermined total number associated with the object ID. The controller controls a timing for terminating the reading operation based on the comparison.

Figure 1:
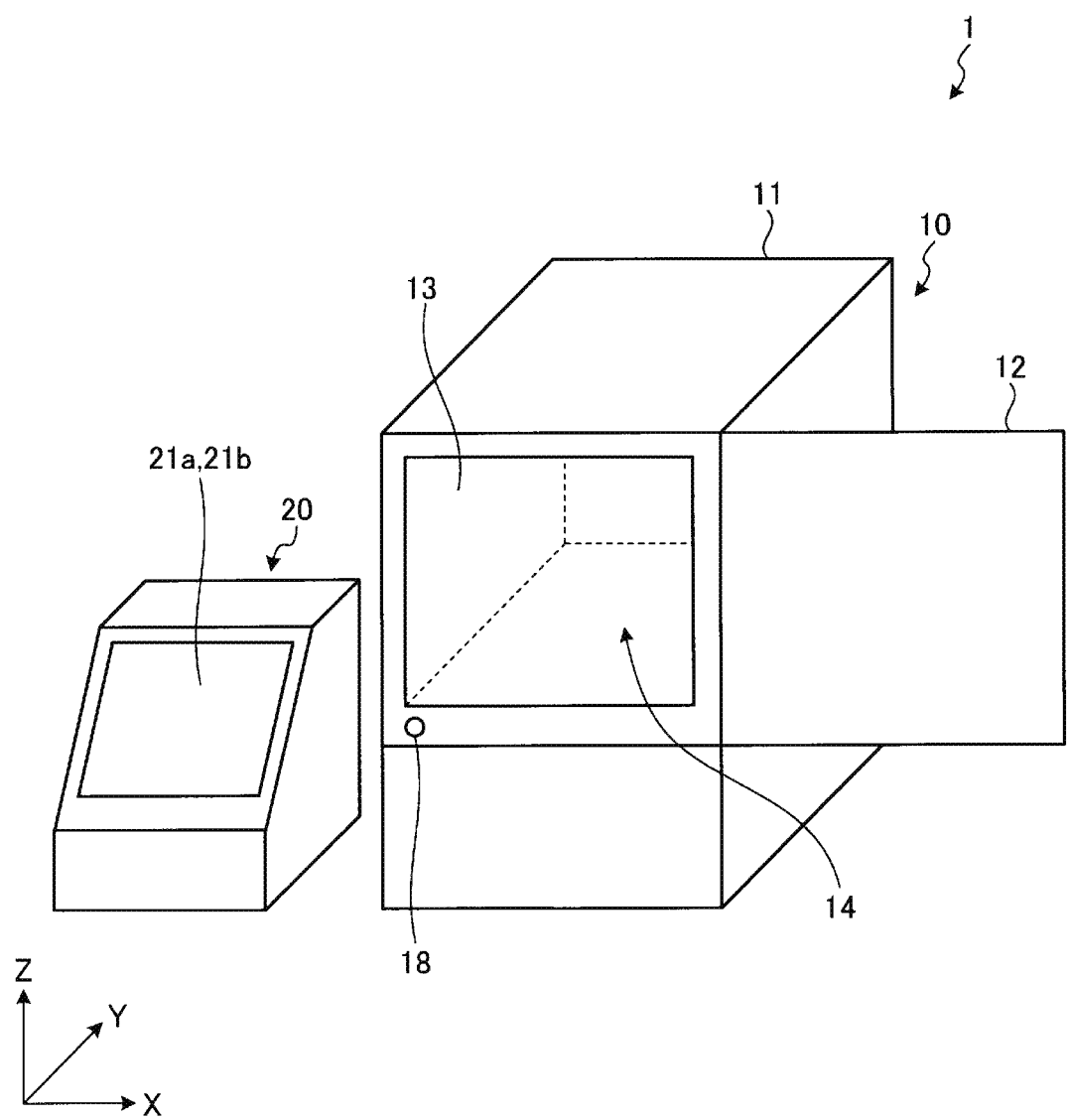
FIG. 1 illustrates an external perspective view of a reading device according to an embodiment.
Figure 2:
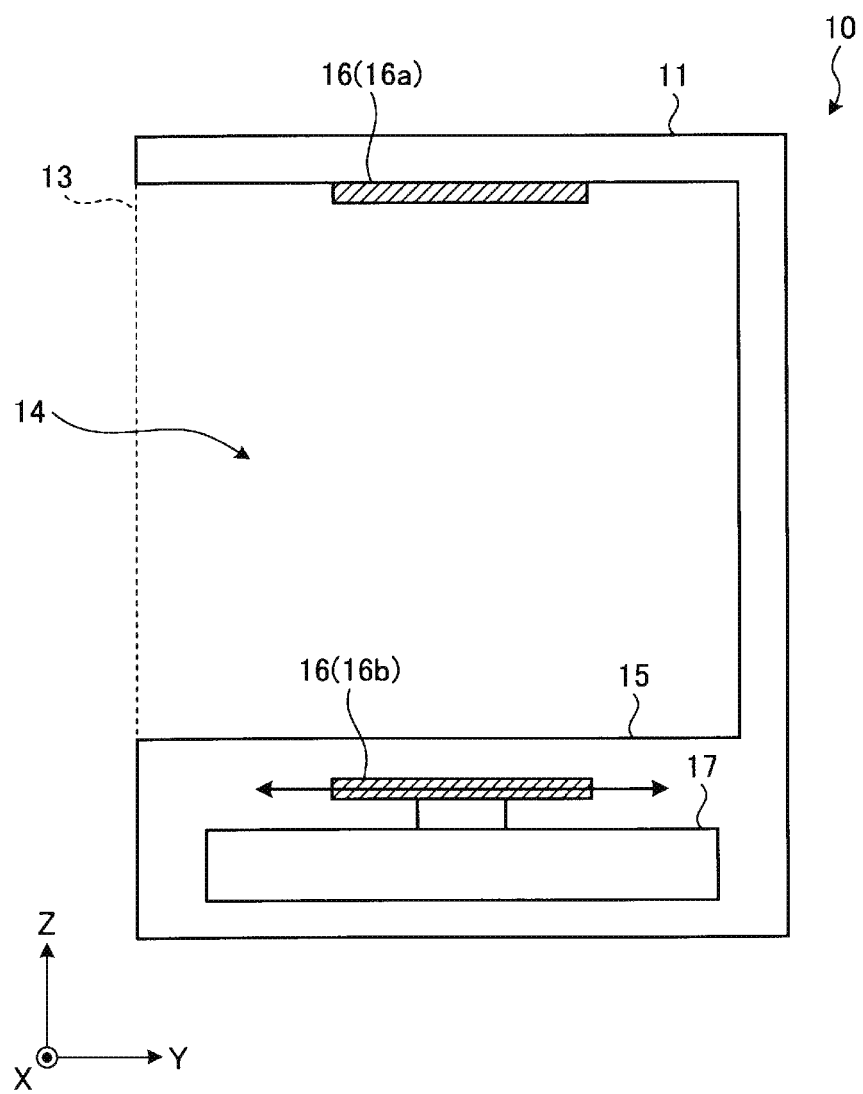
FIG. 2 is a diagram schematically illustrating an example of an RFID antenna provided in a reading unit.

FIG. 1 illustrates an external perspective view of a reading device 1 according to an embodiment. FIG. 2 is a diagram schematically illustrating an internal configuration of a reading unit 10 illustrated in FIG. 1.

The reading device 1 includes a reading unit 10 and a main unit 20. The main unit 20 is an information processing device with a computer configuration and includes a display 21b on which a touch panel 21a is arranged on the surface. For example, a liquid crystal displayer can be used as the display 21b.

The reading unit 10 is an example of a reading device capable of reading information from a radio frequency identifier (RFID) tag attached to an object (hereinafter referred to as tag information). The reading unit 10 includes a casing 11 and a door 12 that opens and closes an opening 13 formed in the casing 11. The casing 11 has a substantial box shape, has, for example, a depth dimension greater than a horizontal width dimension, and a proportion long in a depth direction.

The door 12 is attached to the casing such that the door 12 can be opened and closed through a hinge (not illustrated) formed on the front right surface of the casing 11. The door 12 opens and closes the opening 13 (storage chamber 14). An opening and closing lever (not illustrated) is formed on the surface of the door 12. A user can grip the opening and closing lever to open and close the door 12.

The opening 13 has a size such that a plurality of objects can be passed at a time. The casing 11 includes the storage chamber 14 that has a size such that the plurality of objects can be stored therein. The user can input an object inside the storage chamber 14 through the opening 13 or takes out an object from the storage chamber 14 through the opening 13 of the casing 11 by opening the door 12. An object input in a storage container formed of a material with an insulation property (radio wave transmission property) such as wood or glass may be stored in the storage chamber 14.

In the storage chamber 14, an object is placed on a placement surface 15 (see FIG. 2), which is the bottom surface of the storage chamber 14. The placement surface 15 is formed of a plate member with an insulation property (radio wave transmission property) such as wood or glass and is supported with a predetermined gap formed with the bottom surface of the casing 11. Wall surfaces inside the storage chamber 14 except for the placement surface 15 are formed of a member reflecting radio waves (a radio wave reflection material). As the member, any known radio wave reflection material such as a metal, a molding material, or ferrite can be used.

One RFID antenna 16 or the plurality of RFID antennas 16 for communication with RFID tags are provided inside the storage chamber 14. The RFID antenna 16 is, for example, a planar patch antenna and is installed on a ceiling surface of the storage chamber 14, in a space between the placement surface 15 and the bottom surface of the casing 11, or the like, as illustrated in FIG. 2.

FIG. 2 illustrates an example in which an RFID antenna 16a and an RFID antenna 16b are provided as the RFID antenna 16. The RFID antenna 16a is provided on the ceiling surface of the storage chamber 14 and is fixed to the ceiling surface of the storage chamber 14 so that an antenna surface faces the inside of the storage chamber 14. The RFID antenna 16b is provided in the space between the placement surface 15 and the bottom surface of the casing 11 and is fixed to a motion mechanism 17 so that an antenna surface faces the inside of the storage chamber 14. The motion mechanism 17 is, for example, a linear motion mechanism that includes a rotational power source such as a screw shaft or a stepping motor and a motion stage and moves the RFID antenna 16b in an arrow direction in the drawing in parallel to the placement surface 15. That is, a radio wave radiation range of the RFID antenna 16b is moved with driving of the motion mechanism 17. Although not illustrated, a circuit board or the like for controlling an operation of the reading unit 10 is also provided in the space between the placement surface 15 and the bottom surface of the casing 11.

The wall surfaces of the casing 11 (the storage chamber 14) and the door 12 are formed of a radio wave reflection material or a material (a radio wave absorption material) that absorbs radio waves in order to prevent the radio waves in the casing 11 (the storage chamber 14) from leaking to the outside and prevent external radio waves from penetrating into the casing 11 (the storage chamber 14). A radio wave reflection material or a radio wave absorption material such as a metal, a molding material, or ferrite can be used.

The reading unit 10 includes a detection unit 18 that detects open and closed states of the door 12. The detection unit 18 is provided, for example, between the casing 11 and the door 12 and outputs a signal in accordance with an open or closed state of the door 12.

The reading unit 10 is connected to the main unit 20 by a cable or the like. The reading unit 10 outputs (transmits) tag information that has been read from an RFID tag to the main unit 20 in a wired or wireless manner. In the embodiment, the main unit 20 and the reading unit 10 are separated from each other, but the present disclosure is not limited thereto. The main unit 20 and the reading unit 10 may be integrated in other examples.

In the reading device 1 that has the above-described configuration, an object stored in the storage chamber 14 of the reading unit 10, that is, a reading target object is not particularly limited. For example, an object such as a commodity or a component may be stored or a jig or a tool for assisting retention or processing of the object may be stored. In the embodiment, a plurality of pre-decided RFID tags are assumed to be attached to reading target objects.

Figures 3, 4:
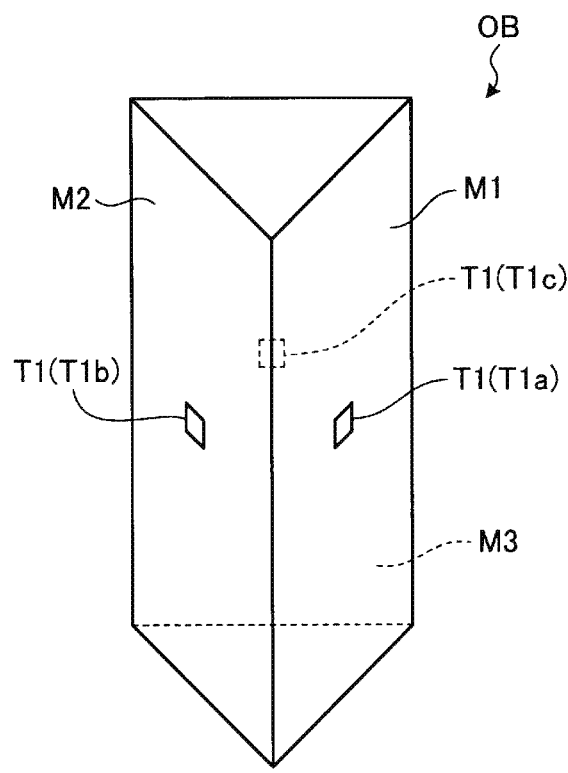
FIG. 3 is a diagram illustrating an example of RFID tags attached to an object.
FIG. 4 is a diagram illustrating an example of a data structure of tag information retained in the RFID tag.

FIG. 3 is a diagram schematically illustrating an example of RFID tags T1 attached to an object OB. In FIG. 3, the object OB has a triangular prismatic shape. The RFID tags T1 (T1a, T1b, and T1c) are attached to three main surfaces M1, M2, and M3 of the object OB, respectively. A first identification code with which the object OB can be identified and a second identification code with which the RFID tag T1 can be identified are stored as tag information in the three RFID tags T1a, T1b, and T1c.

FIG. 4 is a diagram illustrating an example of a data structure of tag information retained in the RFID tags T1. FIG. 4 illustrates a data structure of the tag information in the RFID tags T1a, T1b, and T1c illustrated in FIG. 3.

As illustrated in FIG. 4, each of the RFID tags T1a, T1b, and T1c retains the first identification code (00001) with which the object OB can be identified, as tag information. The first identification code is an example of object identification code and a number unique for each object OB can be allocated in advance. The RFID tags T1a, T1b, and T1c retain different unique second identification codes (0001, 0002, 0003), respectively, as tag information. The second identification code is an example of a tag identification code and a number unique for each RFID tag T1 attached to the same object OB can be allocated in advance.

Figure 5:
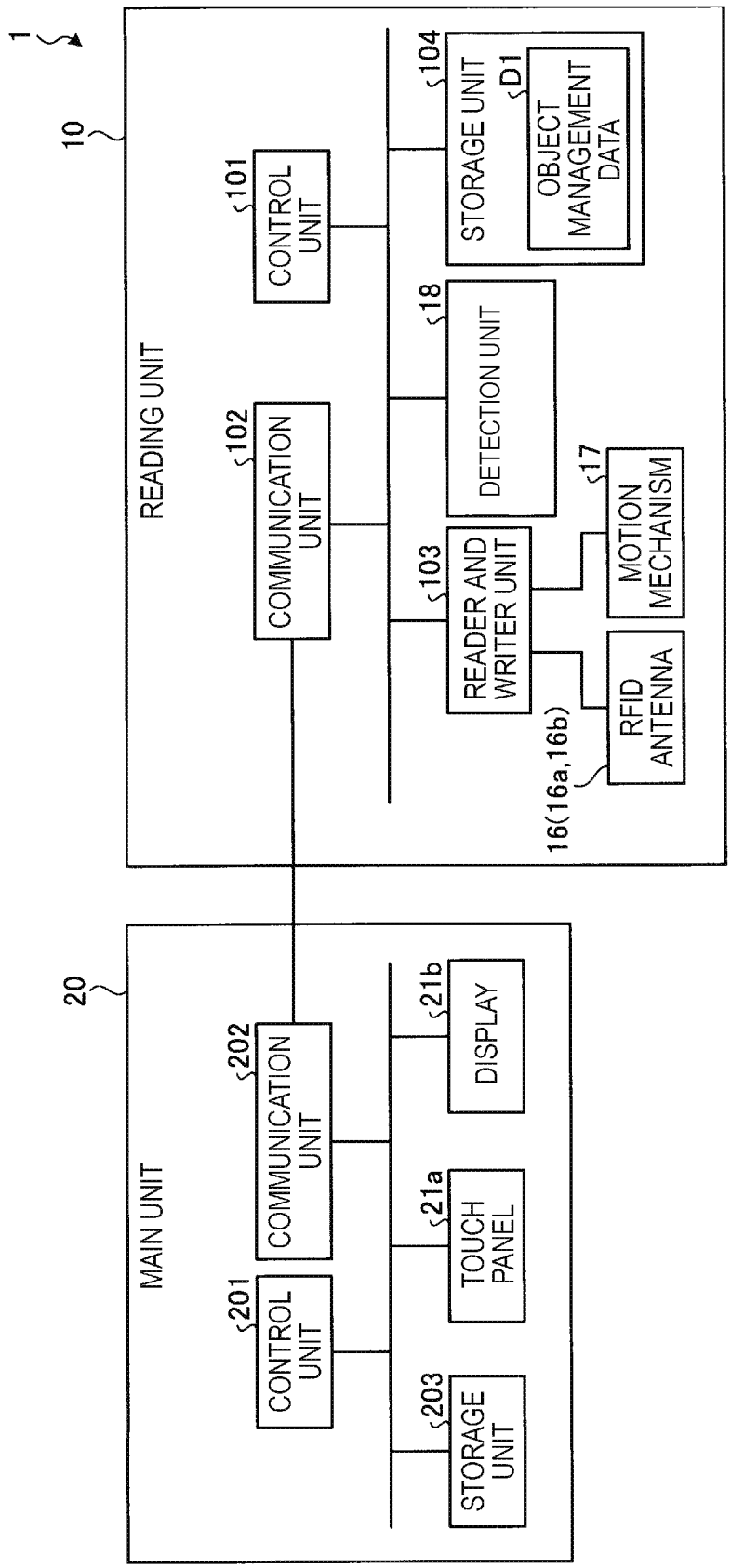
FIG. 5 is a block diagram illustrating a hardware configuration of the reading device.

Next, a hardware configuration of the above-described reading device 1 will be described. FIG. 5 is a block diagram illustrating a hardware configuration of the reading device 1 (the reading unit 10 and the main unit 20).

The main unit 20 includes a control unit 201 that has a computer configuration including a processor such as a central processing unit (CPU), a read-only memory (ROM), and a random access memory (RAM). The ROM stores various kinds of data or various programs executed by the processor. The RAM temporarily stores data or programs when the processor executes various programs.

The touch panel 21a and the display 21b described above are connected to the control unit 201 via various input and output circuits. A communication unit 202, a storage unit 203, and the like are connected to the control unit 201 via various input and output circuits.

The communication unit 202 is a communication interface that transmits and receives various kinds of data to and from the reading unit 10. The storage unit 203 is a storage device that includes a nonvolatile storage medium such as a hard disk drive (HDD) or a solid-state drive (SSD). The storage unit 203 stores various kinds of data and various programs related to operations of the main unit 20. For example, the storage unit 203 stores a conversion table in which the first identification codes and an object name of an object corresponding to the first identification codes are associated.

On the other hand, the reading unit 10 includes a control unit 101 that has a computer configuration including a processor such as a CPU, a ROM, and a RAM. The ROM stores various kinds of data or various programs executed by the processor. The RAM temporarily stores data or programs when the processor executes various programs.

A communication unit 102, a reader and writer unit 103, a storage unit 104, and the like are connected to the control unit 101 via various input and output circuits in addition to the detection unit 18 and the like. For example, the control unit 101, the communication unit 102, the reader and writer unit 103, and the storage unit 104 are mounted on a circuit board included in the control unit 101.

The communication unit 102 is a communication interface that transmits and receives various kinds of data to and from the main unit 20.

The reader and writer unit 103 is a reader and writer device that reads an RFID tag and is connected to the RFID antenna 16 (16a and 16b) and the motion mechanism 17. Specifically, the reader and writer unit 103 transmits modulated waves (radio waves) for reading tag information from the RFID tag by driving the RFID antenna 16 under the control of the control unit 101. The reader and writer unit 103 outputs the tag information read from the RFID tag via the RFID antenna 16 to the control unit 101. The reader and writer unit 103 moves a radio radiation range of the RFID antenna 16b by driving the motion mechanism 17 under the control of the control unit 101.

The detection unit 18 includes, for example, a detection device such as a magnetic sensor or an optical sensor and detects an open or closed state of the door 12. A detection result of the detection unit 18 is output to the control unit 101.

The storage unit 104 is a storage device that includes a nonvolatile storage medium such as an HDD or an SSD. The storage unit 104 stores various kinds of data or various programs related to operations of the reading unit 10. For example, the storage unit 104 stores object management data D1 in which the first identification codes of each object is associated with the number of RFID tags attached to the object.

Figure 6:
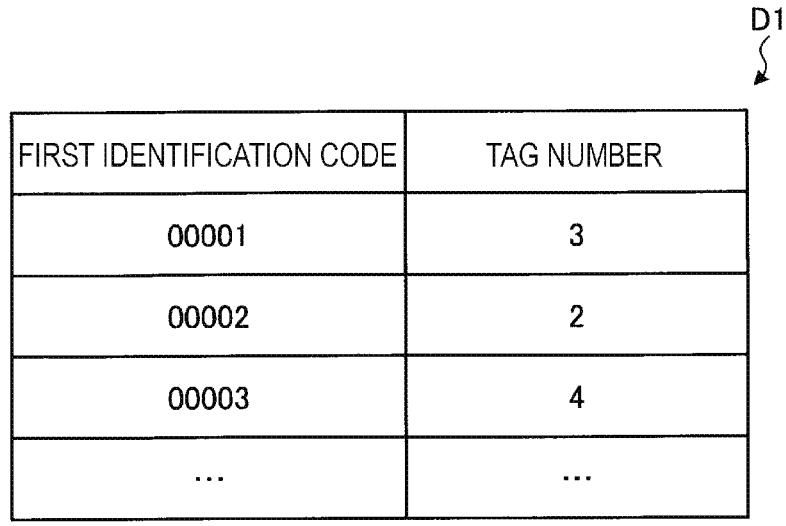
FIG. 6 is a diagram illustrating an example of a data structure of object management data.

FIG. 6 is a diagram illustrating an example of a data structure of object management data D1. As illustrated in FIG. 6, the object management data D1 stores the number of RFID tags (hereinafter referred to as a tag number) attached to each object in association of the first identification codes of the object. Here, the tag number is decided in advance for each object and is set so that a plurality of RFID tags are attached to each object.

Figure 7:
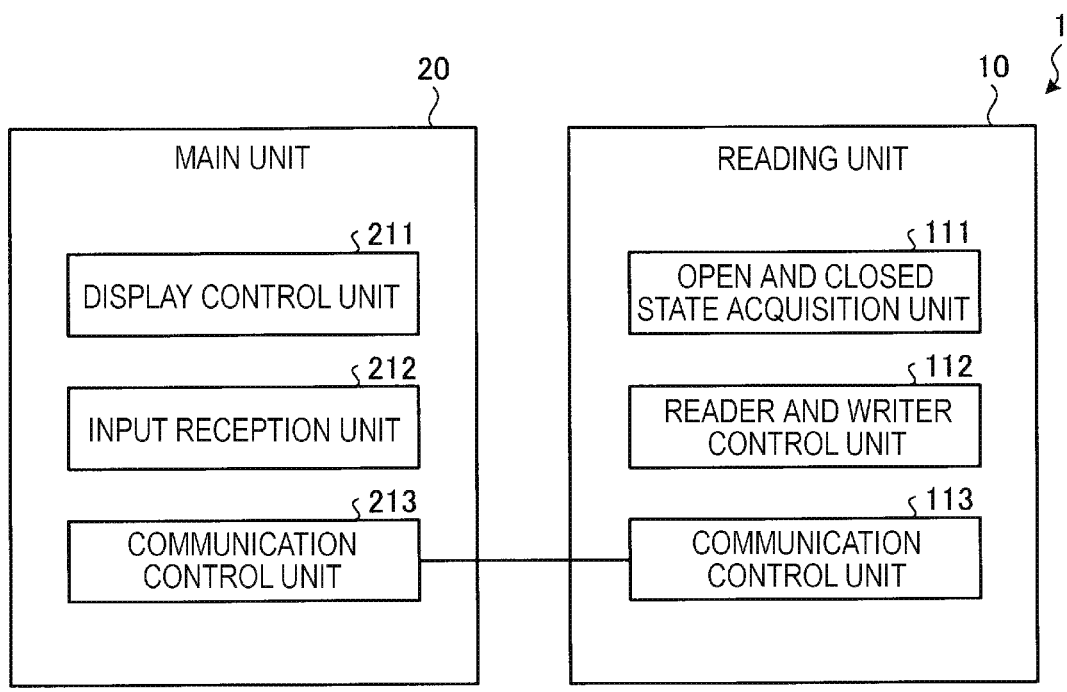
FIG. 7 is a diagram illustrating an example of a functional configuration of the reading device.

Next, a functional configuration of the above-described reading device 1 will be described. FIG. 7 is a block diagram illustrating an example of a functional configuration of the reading device 1 (the reading unit 10 and the main unit 20).

As illustrated in FIG. 7, the main unit 20 includes a display control unit 211, an input reception unit 212, and a communication control unit 213 as functional units. The functional units may have a software configuration realized by the control unit 201 (processor) in cooperation with a program stored in the storage unit 203 or may have a hardware configuration realized by a processor such as an application specific integrated circuit (ASIC) included in the control unit 201.

The display control unit 211 controls the display 21b such that the display 21b displays various screens. For example, the display control unit 211 causes the display 21b to display a graphical user interface (GUI) such as an operator for giving an instruction to start reading an object (RFID tag) (hereinafter referred to as a reading start button) or an operator for giving an instruction to stop the reading (hereinafter referred to as a reading stop button). For example, the display control unit 211 causes the display 21b to display a reading result, a reading situation, or the like of the tag information in cooperation with the reading unit 10.

The input reception unit 212 receives an input operation via the touch panel 21a. For example, when the operator performs an operation (a touch operation) on an operation screen displayed on the display 21b, the input reception unit 212 outputs instruction information corresponding to the operator to the control unit 201.

The communication control unit 213 controls the communication unit 202 to transmit and receive various kinds of information to and from the reading unit 10 via the communication unit 202. For example, when the reading start button is operated, the communication control unit 213 transmits instruction information for giving an instruction to start the reading to the reading unit 10. For example, when the reading end button is operated, the communication control unit 213 transmits instruction information for giving an instruction to end the reading to the reading unit 10. For example, the communication control unit 213 receives a reading result, a reading situation, or the like of the tag information read by the reading unit 10 from the reading unit 10.

On the other hand, the reading unit 10 includes an open and closed state acquisition unit 111, a reader and writer control unit 112, and a communication control unit 113 as functional units. The functional units may have a software configuration realized by the control unit 101 (processor) in cooperation with a program stored in the storage unit 104 or may have a hardware configuration realized by a processor such as an ASIC included in the control unit 101.

The open and closed state acquisition unit 111 acquires open and closed state information indicating whether the door 12 is in an open state or in a closed state in cooperation with the detection unit 18.

The reader and writer control unit 112 controls an operation of reading the object (the RFID tag) stored in the storage chamber 14 by controlling the reader and writer unit 103.

Specifically, when the reader and writer control unit 112 receives an instruction to read the object from the main unit 20, the reader and writer control unit 112 causes the reader and writer unit 103 to read the RFID tag. Here, the reader and writer control unit 112 performs control based on the open and closed state information acquired by the open and closed state acquisition unit 111 such that the reading is suppressed when it is indicated that the door 12 is in the open state, and the reading is performed when it is indicated that the door 12 is in the closed state. A trigger to start the reading is not limited to the instruction from the main unit 20. For example, the reading may start using the fact that the door 12 enters the closed state as a trigger.

When the reader and writer unit 103 reads the tag information, the reader and writer control unit 112 retains the first identification codes and the second identification codes included in the tag information as the read tag information (the first identification codes and the second identification codes) in the RAM or the like. The reader and writer control unit 112 counts the number of read second identification codes for each of the read first identification codes, that is, the number of second identification codes with different code content.

When reading of new tag information (the first identification codes or the second identification codes) is interrupted after the start of the reading, the reader and writer control unit 112 determines a stop timing of the reading of the RFID tag based on the read tag information (the second identification codes).

Specifically, the reader and writer control unit 112 compares the number of second identification codes counted for each first identification code with the tag number set in the object management data D1 associated with the first identification code and determines whether the two numbers are matched.

Here, when the number of read second identification codes matches the tag number with regard to all the read first identification codes, the reader and writer control unit 112 determines that a stop timing of the reading of the RFID tag (hereinafter referred to as a reading stop timing) comes. In this case, the reader and writer control unit 112 stops reading the RFID tag by stopping the operation of the reader and writer unit 103 immediately or after elapse of a predetermined first time (for example, 2 seconds or the like). In this case, the reader and writer control unit 112 may cause the display 21b of the main unit 20 to display a message for prompting an operation of the reading stop button, that is, a report message for prompting the stop of the reading or the like, in cooperation with the main unit 20.

When the number of read second identification codes is different from the tag number with regard to at least some of the read first identification codes, the reader and writer control unit 112 determines that the reading stop timing does not come. In this case, the reader and writer control unit 112 continues the operation of reading the RFID tag (tag information) by extending the reading operation by the reader and writer unit 103 by a predetermined second time (for example, 15 seconds or the like) longer than the above-described first time. Since the unread RFID tags can be read by extending the reading operation by the second time, it is possible to achieve suppression of omission.

The reader and writer control unit 112 determines a subsequent reading stop timing at a timing at which the second time ends. When new tag information is read during the second time, the reader and writer control unit 112 stops counting the second time and resets a count value.

In this way, the reader and writer control unit 112 compares the number of read second identification codes for each object with the tag number set in the object and determines a reading stop timing in accordance with a comparison result. Thus, since the reader and writer control unit 112 can determine the reading stop timing in accordance with a reading situation of the RFID tags attached to each object, it is possible to efficiently set a time until the reading stops.

The reader and writer control unit 112 may set the reading operation at the time of counting of the second time (hereinafter referred to as an extension mode) to be different from a reading operation at the time of non-counting such as the time of reading start (hereinafter referred to as a normal mode). For example, the reader and writer control unit 112 may perform reading using either the RFID antenna 16a or the RFID antenna 16b in the normal mode and may perform reading using both the RFID antenna 16a and the RFID antenna 16b in the extension mode. For example, the reader and writer control unit 112 may perform the reading using the RFID antenna 16a and the RFID antenna 16b in a stationary state in the normal mode and may perform the reading in the extension mode while moving the RFID antenna 16b.

In this way, the reading unit 10 can change a reading environment of the RFID tags by changing the operation of reading the RFID tags between the normal mode and the extension mode. Thus, for example, since RFID tags unreadable in the normal mode due to a reason such as an inappropriate positional relation between the RFID tags and the RFID antenna 16 can be read, it is possible to achieve prevention of omission or an improvement in a reading ratio.

The second time is not limited to a fixed value and may be changed in accordance with a reading situation of the RFID tags. For example, the reader and writer control unit 112 may change the number of hours of the second time in accordance with the number of read first identification codes, that is, the number of first identification codes with different code content or a difference value between the tag number and the number of second identification codes, that is, the number of deficient second identification codes. In this case, the second time is preferably set to be longer the greater the number of first identification codes or second identification codes.

The communication control unit 113 controls the communication unit 102 to transmit and receive various kinds of information to and from the main unit 20 via the communication unit 102. For example, the communication control unit 113 receives instruction information for giving a reading start instruction transmitted from the main unit 20. For example, the communication control unit 113 transmits the read tag information or the like to the main unit 20 under the control of the reader and writer control unit 112. For example, the communication control unit 113 receives instruction information for giving a reading end instruction transmitted from the main unit 20.

When the tag information is transmitted to the main unit 20, the communication control unit 113 may transmit both the first identification codes and the second identification codes included in the tag information or may transmit only the first identification codes. A timing at which the communication control unit 113 transmits the tag information to the main unit is not particularly limited. For example, the communication control unit 113 may transmit the first identification codes to the main unit 20 whenever new first identification codes are read. For example, the communication control unit 113 may transmit the second identification codes determined to match the tag number or the first identification codes corresponding to the second identification codes to the main unit 20 at timing at which the number of second identification codes is determined to match the tag number. For example, the communication control unit 113 may transmit the tag information read until then to the main unit 20 at a timing at which the reading stops.

The communication control unit 113 may transmit reading situation information indicating a reading situation of the RFID tags to the main unit 20. Here, the reading situation information is, for example, information indicating the read first identification codes or a matching determination result between the tag number and the number of second identification codes and may include information indicating a ratio of the number of read second identification codes to the tag number. The reader and writer control unit 112 may cause the display 21b of the main unit 20 to display the reading situation information via the communication control unit 113.

FIG. 8 is a diagram illustrating an example of reading situation information displayed on the main unit 20. As illustrated in FIG. 8, the read first identification codes are displayed in association with the reading situation as the reading situation information on the display 21b of the main unit 20. Here, in the reading situation, a ratio of the number of read second identification codes to a predetermined tag number is expressed in a fraction form. As illustrated in FIG. 8, a reading situation of the second identification codes to the first identification code "00001" is "3/3," a reading situation of the second identification codes to the first identification code "00002" is "1/2," and a reading situation of the second identification codes to the first identification code "00003" is "3/4".

The user can check the reading situation of the object (the RFID tags) by referring to the reading situation information displayed on the display 21b of the main unit 20. Thus, for example, when some of the RFID tags attached to an object may not read due to failure, the user can easily specify the object to which the failed RFID tags are attached by checking the reading situation information.

Figure 9:
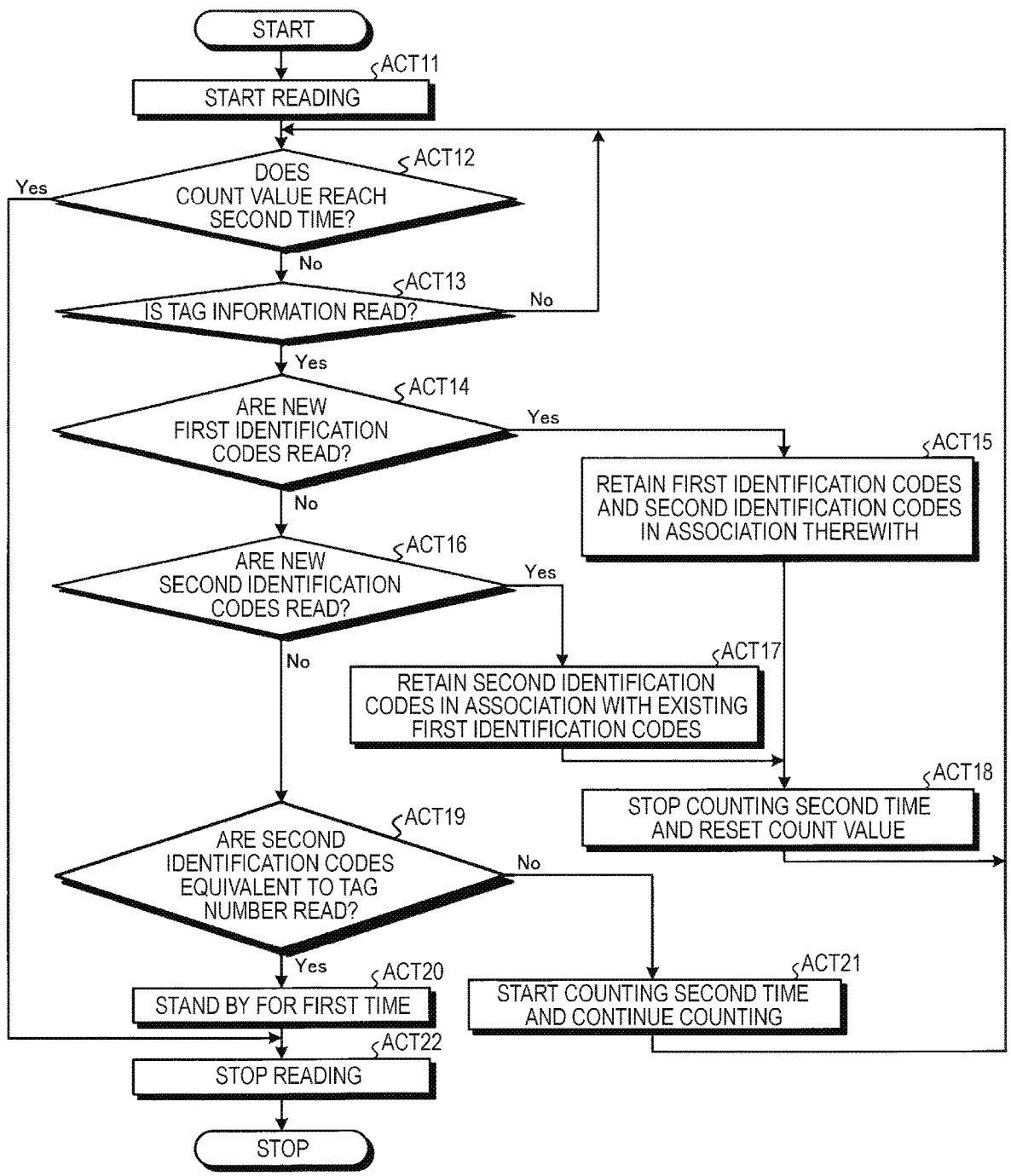
FIG. 9 is a flowchart illustrating an example of a reading process performed by the reading device.

Next, an operation of the reading device 1 will be described. FIG. 9 is a flowchart illustrating an example of a reading process performed by the reading device 1 (the reading unit 10). As the premise of this process, an object is stored in the storage chamber 14 and the door 12 of the reading unit 10 is in the closed state. A count value for counting the second time is assumed to be set to an initial value.

First, the reader and writer control unit 112 causes the reader and writer unit 103 to start reading the RFID tags in response to a predetermined trigger (ACT11). Subsequently, the reader and writer control unit 112 determines whether or not the count value reached the second time (ACT12). Here, since the count value is the initial value in the normal mode such as the time of reading start, the reader and writer control unit 112 determines that the count value does not reach the second time (No in ACT12), and the process proceeds to ACT13.

Subsequently, the reader and writer control unit 112 determines that the reader and writer unit 103 reads the tag information (ACT13). When the tag information is not read (No in ACT13), the reader and writer control unit 112 returns the process to ACT12. In addition, when the tag information is not read in ACT13 (No in ACT13), the process may proceed to ACT21. In this case, since the second time starts to be counted in ACT21, the reading can be stopped after the second time, for example, even when the reading starts without storing an object in the storage chamber 14.

Conversely, when the tag information is read in ACT13 (Yes in ACT13), the reader and writer control unit 112 determines whether or not the new first identification codes are read by comparing the first identification codes included in the tag information with the read (existing) first identification codes (ACT14).

When the first identification code read in ACT13 does not match any of the existing first identification codes, the reader and writer control unit 112 determines that the new first identification codes are read (Yes in ACT14). In this case, the reader and writer control unit 112 retains the first identification codes and the second identification codes included in the tag information read in ACT13 in association therewith in the RAM or the like. Subsequently, after the reader and writer control unit 112 stops counting the second time and resets the count value (ACT18), the process returns to ACT12.

When the first identification codes read in ACT13 match any of the existing first identification codes, the reader and writer control unit 112 determines that the existing first identification codes are read (No in ACT14). In this case, the reader and writer control unit 112 determines whether or not the new second identification codes are read by comparing the second identification codes included in the tag information read in ACT13 with the existing second identification codes (ACT16).

When the second identification codes read in ACT13 do not match any of the existing second identification codes, the reader and writer control unit 112 determines that the new second identification codes are read (Yes in ACT16). In this case, the reader and writer control unit 112 retains the second identification codes included in the tag information read in ACT13 in association with the existing first identification codes determined to be matched in the RAM or the like (ACT17). Subsequently, after the reader and writer control unit 112 stops counting the second time and resets the count value (ACT18), the process returns to ACT12.

When the second identification codes read in ACT13 match any of the existing second identification codes, the reader and writer control unit 112 determines that the existing second identification codes are read (No in ACT16). Subsequently, the reader and writer control unit 112 determines whether or not the second identification codes equivalent to the tag number are read with regard to all the read first identification codes based on a comparison result between the number of second identification codes counted for each of the existing first identification codes and the tag number set in association with the first identification code (ACT19).

Here, when all the comparison results between the number of second identification codes and the tag number are matched, the reader and writer control unit 112 determines that the second identification codes equivalent to the tag number are read with regard to all the read first identification codes (Yes in ACT19). In this case, after the predetermined first time stands by (ACT20), the reader and writer control unit 112 stops the reading operation by the reader and writer unit 103 (ACT22).

Conversely, when some or all of the comparison results between the number of second identification codes and the tag number are not matched, the reader and writer control unit 112 determines that there are the unread RFID tags (the second identification codes) (No in ACT19). In this case, the reader and writer control unit 112 determines that the reading stop timing does not come and starts counting the second time (ACT21), and then the process returns to ACT12. When the second time is being counted in ACT21, the reader and writer control unit 112 returns the process to ACT12 while the counting continues.

When the process returns to ACT12 and the count value does not reach the second time (No in ACT12), the reading of the RFID tags continues. When new tag information (the first identification codes or the second identification codes) is read, the count value is reset in ACT18. That is, the reading unit 10 operates in the normal mode while the new tag information is being read. When the existing tag information is read, the normal mode moves to the extension mode.

Conversely, when the count value reaches the second time in ACT12 (Yes in ACT12), the reader and writer control unit 112 stops the reading operation by the reader and writer unit 103 (ACT22). The tag information read through the reading process is assumed to be transmitted to the main unit 20 via the communication unit 102.

As described above, the reading device 1 (the reading unit 10) reads the tag information with which objects and a plurality of pre-decided RFID tags attached to the object are able to be specified, from the RFID tags of the objects to which the RFID tags are attached and determines whether or not the number of read RFID tags counted for each object matches the tag number of the RFID tags pre-decided to be added to the object. Then, the reading device 1 determines a stop timing of the reading in accordance with the result of the matching determination. Thus, since the reading device 1 can control the stop timing of the reading in accordance with a reading situation of the RFID tags attached to each object, it is possible to efficiently read the RFID tags.

For example, the tag information for retaining the RFID tags includes the first identification codes and the second identification codes, as described in the foregoing embodiment, but the present disclosure is not limited thereto. Only the second identification codes may be included. In this case, the reading unit 10 stores a table in which each of the second identification codes are associated with the first identification codes for identifying objects to which the RFID tags for retaining the second identification codes are attached, in the storage unit 104 or the like and specifies the corresponding first identification codes based on the second identification codes read by the reader and writer unit 103. That is, the second identification codes in the tag information function as tag identifiers with which the RFID tags are able to be identified and function as object identifiers with which the objects are able to be identified (specified).

The RFID antenna 16*a* and the RFID antenna 16*b* are provided as the RFID antenna 16, as described in the foregoing embodiment, but a position at which the RFID antenna 16 is provided or the configuration of the RFID antenna 16 is not particularly limited as long as radio waves can be radiated to reading target objects (RFID tags). For example, one of the RFID antenna 16a and the RFID antenna 16b may be provided. For example, the RFID antenna 16 may be provided at another position such as a rear surface of the storage chamber 14.

The reading unit 10 and the main unit 20 are separated from each other, as described in the foregoing embodiment, but the present disclosure is not limited thereto. The reading unit 10 and the main unit 20 may be integrated. The control unit 101 (the reader and writer control unit 112) of the reading unit 10 controls the reading start and stop timings of the reading unit 10, as described in the above-described embodiment. However, the control unit 201 of the main unit 20 may have a similar function to the reader and writer control unit 112 to control the reading start and stop timings of the reading unit 10.

The reading device 1 (the reading unit 10) has the enclosed configuration of the box shape, as described in the foregoing embodiment, but the form of the reading device 1 is not limited thereto. For example, by disposing the RFID antenna 16 in a low portion of a plate surface with a plate shape, an open reading device reading tag information from objects (RFID tags) placed on the plate surface may be realized. A handheld (portable) reading device may also be realized.

A program executed in each device according to the foregoing embodiment is embedded in advance in a recording medium included in each device, but the present disclosure is not limited thereto. The program may be recorded on a computer-readable recording medium such as a CD-ROM, a flexible disc (FD), a CD-R, or a digital versatile disk (DVD) in a file with an installable format or an executable format for supply. Further, the recording medium is not limited to a medium independent from a computer or an embedded system and also includes a recording medium that downloads a program delivered via a LAN, the Internet, or the like and stores the program or temporarily stores the program.

The program executed in each device according to the foregoing embodiments may be stored on a computer connected to a network such as the Internet and may be downloaded via the network for supply. The program executed in each device according to the foregoing embodiments may be supplied or distributed via a network such as the Internet.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and equivalents are intended to cover such forms or modifications as would fall within the scope and spirit of the invention.

What is claimed is:

1. A reading device, comprising:
   a first antenna configured to receive tag information from radio frequency identification (RFID) tags attached to objects in a receiving range;
   a data storage unit storing an object ID in association with a predetermined total number of RFID tags attached to an object corresponding to the object ID, the predetermined total number of RFID tags associated with the object ID being a plural number; and
   a controller configured to:
     start a reading operation in which the first antenna emits radio waves and receives tag information from the RFID tags;
     count the number of RFID tags associated with the object ID according to the tag information received from the RFID tags during the reading operation;
     compare the counted number of RFID tags associated with the object ID to the predetermined total number of RFID tags associated with the object ID; and
     control a timing for terminating the reading operation based on the comparison of the counted number of RFID tags associated with the object ID to the predetermined total number of RFID tags associated with the object ID, wherein the controller is configured to, for control of the timing,
     set the reading operation to continue for a first time period if the counted number of RFID tags associated with the object ID is equal to the predetermined total number of RFID tags associated with the object ID, and
     set the reading operation to continue for a second time period longer than the first time period if the counted number of RFID tags associated with the object ID is less than the predetermined total number of RFID tags associated with the object ID.

2. The reading device according to claim 1, wherein the controller is further configured to reset counting of the second time period if an RFID tag associated with a new object ID is obtained during the reading operation.

3. The reading device according to claim 1, wherein
   the first antenna is movable, and
   the controller is further configured to cause the first antenna to be stationary during the first time period and move during the second time period.

4. The reading device according to claim 1, further comprising:
   a second antenna configured to receive tag information from RFID tags attached to objects in a second receiving range, wherein
   the controller is further configured to disable the second antenna during the first time period and enable the second antenna during the second time period.

5. The reading device according to claim 4, wherein the first antenna is fixed, and the second antenna is movable.

6. The reading device according to claim 4, wherein the first antenna is movable, and the second antenna is fixed.

7. The reading device according to claim 1, wherein the controller is configured to:
   set the reading operation to continue for the second time period if the counted number of RFID tags associated with the object ID is less than the predetermined total number of RFID tags associated with the object ID by a first amount or less, and
   set the reading operation to continue for a third time period longer than the second time period if the counted number of RFID tags associated with the object ID is less than the predetermined total number of RFID tags associated with the object ID by greater than the first amount.

8. The reading device according to claim 1, wherein the controller is configured to cause a display of information indicating the comparison of the counted number of RFID tags associated with the object ID to the predetermined total number of RFID tags associated with the object ID.

9. A method of reading tag information, the method comprising:

starting a reading operation during which a first antenna emits radio waves and receives tag information from radio frequency identification (RFID) tags attached to objects;

counting of the number of RFID tags associated with an object ID included in the tag information received from the RFID tags during the reading operation;

comparing the counted number of RFID tags associated with the object ID to a predetermined total number of RFID tags attached to an object associated with the object ID, the predetermined total number of RFID tags associated with the object ID being a plural number; and controlling a timing for terminating the reading operation based on the comparison of the counted number of RFID tags associated with the object ID to the predetermined total number of RFID tags associated with the object ID, wherein the controlling the timing comprises:

setting a time period for which the reading operation is to be continued to a first time period when the counted number of RFID tags associated with the object ID equal to the predetermined total number of RFID tags associated with the object ID, and setting the time period to a second time period longer than the first time period when the counted number of RFID tags associated with the object ID is less than the predetermined total number of RFID tags associated with the object ID.

10. The method according to claim 9, further comprising:
resetting counting of the second time period if an RFID tag associated with a new object ID is obtained during the reading operation.

11. The method according to claim 9, further comprising:
moving the first antenna during the second time period.

12. The method according to claim 9, further comprising:
using the first antenna and a second antenna separate from the first antenna for receiving tag information during the second time period.

13. The method according to claim 12, further comprising:
moving at least one of the first and second antennas during the reading operation.

14. The method according to claim 12, wherein the second antenna is moved during the second time period.

15. The method according to claim 9, wherein the controlling the timing comprises:

setting a length of the time period for which the reading operation is to be continued to according to the difference between the counter number of RFID tags associated with the object ID and the predetermined total number of RFID tags associated with the object ID such that the length of the time period is greater as the difference becomes greater.

16. The method according to claim 9, further comprising:
displaying information, on a display screen, corresponding to the comparison of the counted number of RFID tags associated with the object ID to the predetermined total number of RFID tags associated with the object ID.

* * * * *